United States Patent
Duschl et al.

(10) Patent No.: US 9,747,528 B1
(45) Date of Patent: Aug. 29, 2017

(54) CAPTURING CONTEXTUAL INFORMATION ON A DEVICE

(71) Applicant: International Business Machines Corporation, Armonk, NY (US)

(72) Inventors: Heather L. Duschl, Raleigh, NC (US); Alexandra D. Markello, Durham, NC (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/334,598

(22) Filed: Oct. 26, 2016

(51) Int. Cl.
*G06K 9/72* (2006.01)

(52) U.S. Cl.
CPC ...................................... *G06K 9/72* (2013.01)

(58) Field of Classification Search
CPC .. G06F 19/322; G06F 19/328; G06F 19/3418; G06F 19/6245
USPC ............... 382/209, 224, 229, 278, 282, 307; 709/217, 218, 219
See application file for complete search history.

(56) References Cited

U.S. PATENT DOCUMENTS

| | | | | |
|---|---|---|---|---|
| 6,850,252 B1* | 2/2005 | Hoffberg | ............ | G06K 9/00369 348/E7.061 |
| 7,334,728 B2* | 2/2008 | Williams | ............... | G06Q 10/00 235/381 |
| 7,587,368 B2* | 9/2009 | Felsher | ................ | G06F 19/322 123/620 |
| 7,590,589 B2* | 9/2009 | Hoffberg | ............... | G06Q 20/401 705/35 |
| 7,602,773 B2* | 10/2009 | Frank | ...................... | H04L 12/24 370/381 |
| 7,872,669 B2* | 1/2011 | Darrell | ............. | G06F 17/30277 348/207.1 |
| 7,970,213 B1* | 6/2011 | Ruzon | ................ | G06K 9/00463 382/217 |
| 8,136,028 B1* | 3/2012 | Loeb | ................ | G06F 17/30268 715/200 |
| 8,155,526 B2* | 4/2012 | Gray | ...................... | H04L 12/10 370/463 |
| 8,485,438 B2 | 7/2013 | Dollard | | |
| 8,533,199 B2 | 9/2013 | Malla | | |

(Continued)

FOREIGN PATENT DOCUMENTS

CN        103118107        5/2013

OTHER PUBLICATIONS

Chen et al, "A Method and System for Identifying a Uniform Resource Locator of a Website Based on Image Recognition," ip.com Prior Art Database Technical Disclosure, IPCOM000237378, Jun. 2014, 3 pages.

*Primary Examiner* — Yosef Kassa
(74) *Attorney, Agent, or Firm* — VanLeeuwen & VanLeeuwen; Richard A. Wilhelm

(57) ABSTRACT

An approach is disclosed that captures, at a digital camera of a first information handling system, a digital image of a display of a second information handling system. The approach analyzes the captured digital image with the analysis resulting in an identification of a network location that corresponds to the captured digital image. Data from the identified network location is retrieved via a network connection from the first information handling system and this data is displayed on a display that is accessible by the first information handling system.

17 Claims, 7 Drawing Sheets

(56) References Cited

U.S. PATENT DOCUMENTS

| | | | | |
|---|---|---|---|---|
| 8,594,424 B2 * | 11/2013 | Hwang | ................ | G06K 9/228 |
| | | | | 382/173 |
| 8,619,111 B2 * | 12/2013 | Roach, Jr. | ............... | H04M 3/42 |
| | | | | 345/629 |
| 8,676,623 B2 * | 3/2014 | Gale | ..................... | G01C 21/20 |
| | | | | 705/7.13 |
| 2007/0073777 A1 | 3/2007 | Werwath et al. | | |
| 2009/0259745 A1 | 10/2009 | Lee | | |
| 2014/0019484 A1 | 1/2014 | Coppin et al. | | |
| 2015/0178786 A1 | 6/2015 | Claessens | | |
| 2015/0213194 A1 | 7/2015 | Wolf et al. | | |
| 2016/0140588 A1 | 5/2016 | Bracewell | | |

* cited by examiner

CAPTURING CONTEXTUAL INFORMATION ON A DEVICE

BACKGROUND

When something interesting from the Internet catches a user's eye on a device, such as an airport kiosk display, a friend's smart phone, a library computer, or the like, but it's not the time and/or device that you want to use to investigate the item of interest, it can be frustrating. For example, suppose a user is browsing the internet on a public computer at the library and finds something that the user would like to send to her brother as a birthday gift. However, the user likely does not want to enter any of the user's personal information or credit card information on the library computer. Instead, the user wants to buy the item on the user's home computer later in the day, but in order to remember the website, the user is forced to copy and paste the website information and either print it to a piece of paper or otherwise manually copy the website address. In another example, the user is on the subway and one of the user's friends shows her an article on their WiFi tablet that the user would like to read later when you get home. The user can ask the friend to send her an email with a link to the article later when they have internet access, but they are likely to forget the request and the user might never receive the link or be able to read the interesting article. In yet another example, a friend shows the user a social media post that has extensive information about an upcoming bike tour of interest to the user. The user is in a hurry, but would like to examine the bike tour information later. Again, the user could ask the friend to email a link to the bike tour article, but the friend might likely forget to do so. Traditional solutions allow the user, or the user's contacts, to text or email such items of interest to the user's email account. However, this can be time-consuming, may cause the user to share personal email information with strangers, and the information may never be received because of incorrectly entered website data or forgetfulness on the part of others.

SUMMARY

An approach is disclosed that captures, at a digital camera of a first information handling system, a digital image of a display of a second information handling system. The approach analyzes the captured digital image with the analysis resulting in an identification of a network location that corresponds to the captured digital image. Data from the identified network location is retrieved via a network connection from the first information handling system and this data is displayed on a display that is accessible by the first information handling system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
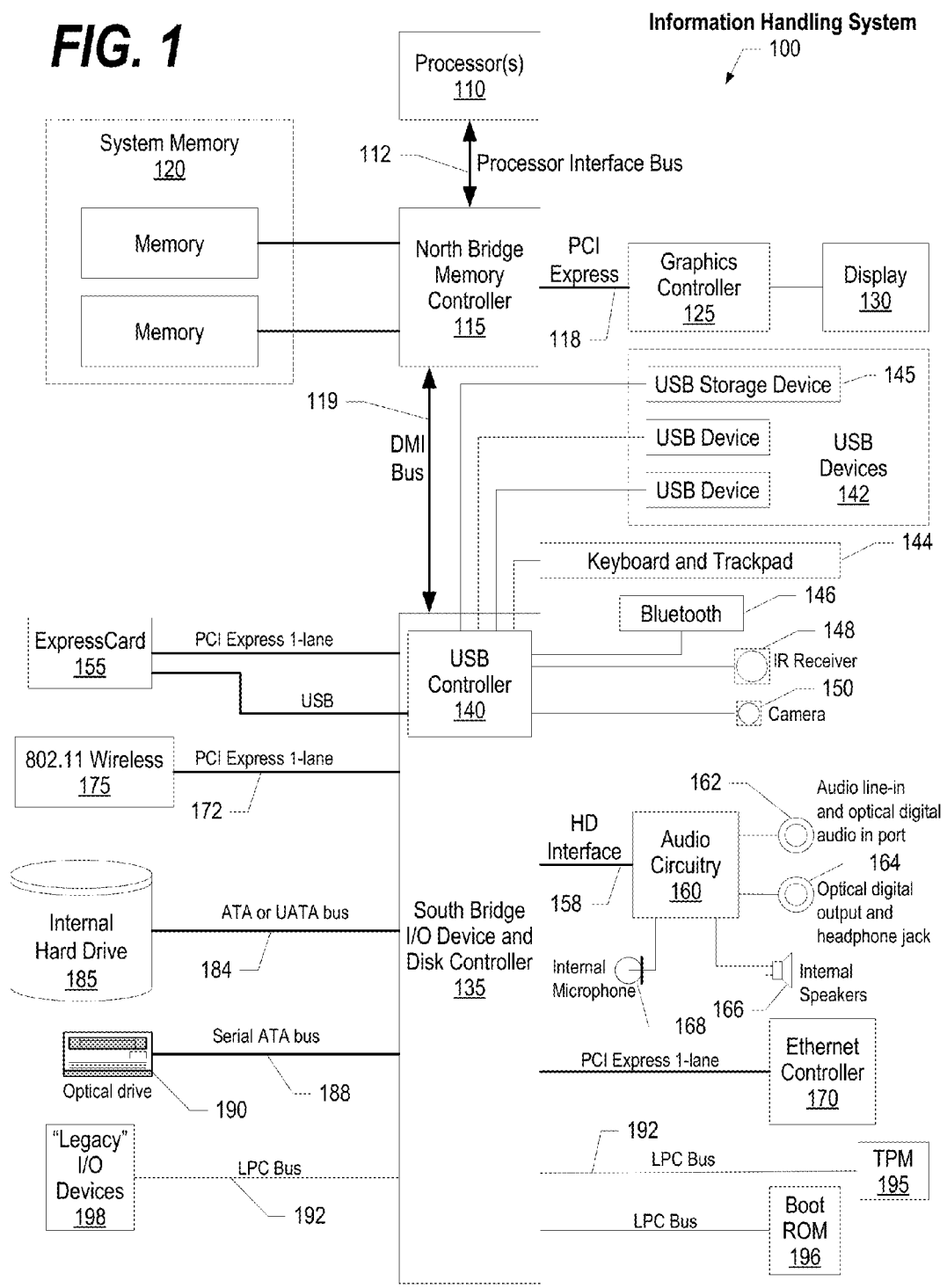
FIG. 1 is a block diagram of a data processing system in which the methods described herein can be implemented.

FIGS. 1-7 show an approach to capture contextual information displayed on one device and facilitate its access and processing on another device. There is no need for the user of either device to take further action (e.g., email, message, etc.) after the capture. In addition, typographical errors are avoided, and neither user has to remember to share the information at a later time.

In one embodiment, an application or part of the operating system resides in a mobile device, such that the capabilities are enabled across all applications on the device. In such an embodiment, implementation steps would include the following. First, User A is accessing a web page or application on Device A (e.g. a particular social media post, a particular item on a store's website, an article on a blog, etc.). Second, User A shows Device A to User B, who is very interested and wants to access that same information on Device B and/or another device (e.g., Device C), now, or at a later time. Third, User B uses a built-in camera on Device B to capture a digital image of the display on Device A that shows the item of interest. Fourth, User B identifies this image as an interactive image (as opposed to a regular photograph) through a particular user interaction (e.g. keystrokes, gesture, selection, etc.).

Fifth, optionally, User B specifies the type of interaction that is desired with the captured context, such as (1) view the same information; (2) log in and add the specific item to the user's shopping cart (using user profile information, such as clothing sizes, etc.); (3) log in and order the specific item using saved credit card information; (4) create a new account (supplying email address, name, mailing address, credit card information); (5) access the website via the web browser or via an application; and (6) any combination of the above. Sixth, optionally, User B specifies a later date/time/device for the subsequent interaction. If this occurs, system activity related to this particular contextual capture pauses here until the specified date/time, and optionally shares the contextual information with Device C as chosen by User B.

Seventh, the system "mines" the image capture for information, including: (1) identification of the application in use (web browser, e-reader, application, etc.); and (2) any addressing information to identify the location within the application (e.g. URL, item being viewed, article being viewed, etc.). Eighth, if the capture does not contain a title to identify the application in use, the user's history or an external archive can be used to compare aspects of the view with images of the application in use.

Ninth, if the capture does not contain all of the addressing information required to reach the desired view (e.g. the URL is too long and doesn't show entirely on the screen, the captured view is not the "landing page" of an application, etc.) then processing includes (1) other parts of the page can be collected (image and text analysis) and website crawling can be executed to find the particular view/content; and (2) the user's personal browsing or app interaction history, a crowd-sourced history or an external archive can also be used to find the path necessary to traverse to the desired view. Tenth, Device B then recreates the steps required to reach the desired context from the collected image capture. Eleventh, if the desired context requires logging in (detected either through error messages or through available capabilities), the system will log User B into the application or website automatically (using existing password wallet capabilities). And, twelfth, optionally, the system can automatically remove the captured image once User B has accessed the captured context on Device B or forwarded the contextual information to Device C (so that it is not retained in the gallery or synchronized to a photographic archive).

The following non-limiting examples are provided to depict how the approach can be used in different situations. First, in an example scenario with a social media application:

1. Mary is accessing social media and says to Jane, "Did you see that posting about the upcoming bike ride fundraiser? We need to sign up!"

2. Jane says "No" and Mary shows Jane her phone

3. Jane uses her phone to capture a snapshot of the view on Mary's phone.

4. Jane uses the camera menu option to identify this image as an interactive image.

5. Jane accepts the default interaction type (viewing that information).

6. Jane specifies that she'll want to view the information this evening when she gets home from work, and the system waits until then to perform the interaction.

7. The system "mines" Jane's image capture and determines that this is the a social media website in a web browser and it is a posting by a particular group.

8. The system recognizes the controls (back, forward, share, bookmarks, etc.) as being controls for the system web browser.

9. The system recognizes the entry as being posted by "The Reel Housewives of Topsail Island" and found the image in the photo archives for that user.

10. Jane's phone accesses the captured social media page and entry in the photo archives for the page.

11. The system logs Jane into the social media website because the page is protected.

12. Optionally, the system removes the captured interactive image after Jane has accessed the content displayed in the image.

Next is depicted an example scenario of a retail shopping application. In this example:

1. Mark is buying a soccer jersey on a merchant website and reminds Larry that he needs to order his, too.

2. Mark shows Larry the version he ordered.

3. Larry uses the built-in camera on his phone to capture a snapshot of the view on Mark's phone.

4. Larry identifies this image as an interactive image through a command (e.g., holding the screenshot key combination extra long, etc.).

5. Larry specifies that the system should order the item in his size using his saved credit card information.

6. Larry chooses for the interaction to occur immediately.

7. The system "mines" the image capture to see that it was from a particular merchant application and website.

8. The system "mines" the image capture to see that it was the $89.99 version of a particular jersey.

9. Larry's phone logs him in, accesses the jersey, specifies the size to be Men's Large (Larry's size) and orders the jersey.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
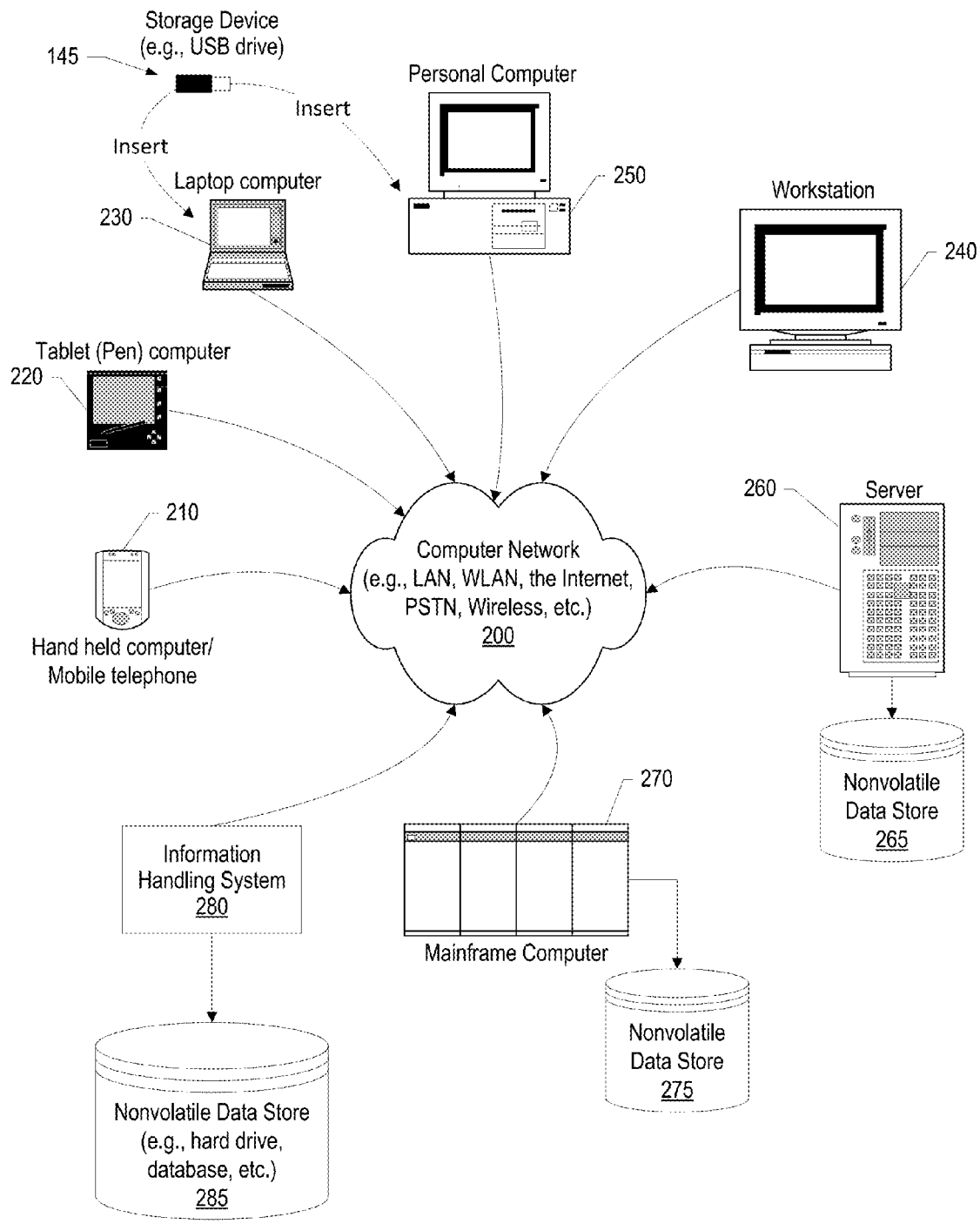
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
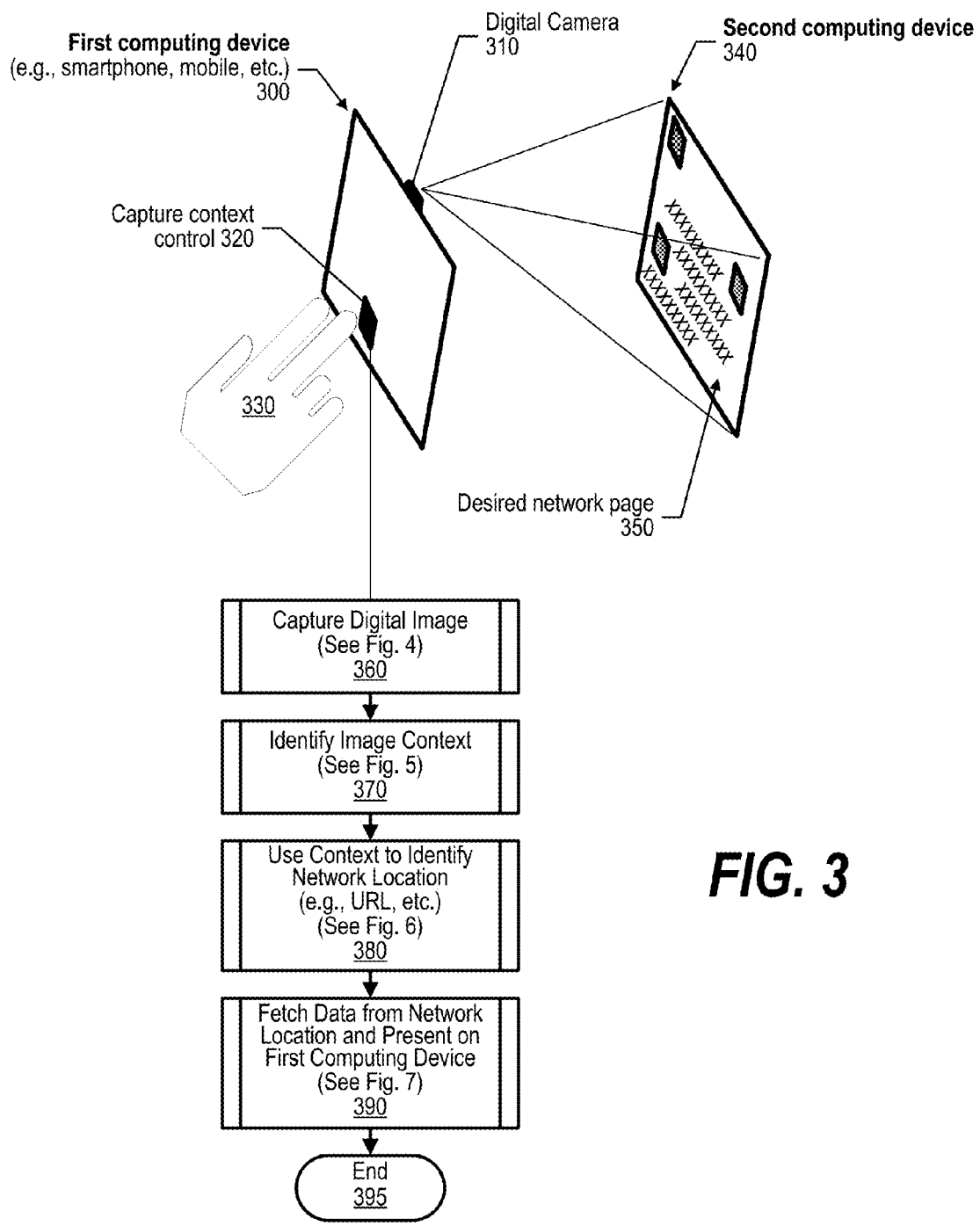
FIG. 3 is a component diagram depicting components used to capture contextual information on a device.

FIG. 3 is a component diagram depicting components used to capture contextual information on a device. First information handling system device 300, such as a smart phone, tablet computer system, laptop computer system, etc., includes digital camera 310 either integrated into the first information handling system or as an accessory added to the first information handling system and connected to the system over an interface, such as a Universal Serial Bus (USB) port. Capture context control 320 is utilized by the user of the first information handling system to execute a process that captures a digital image of a display shown on a second information handling system, shown as desired network page 350 that is displayed on second information handling system 340. The capture context control can be a gesture, graphical user interface (GUI) control, or the like, that informs the first information handling system that the user wishes to capture the context shown on another display. In one embodiment, the user utilizes a pointing device, such as a finger (330), mouse, track pad, or other mechanism to select the capture context control.

When capture context control 320 has been selected, a set of processes is executed on the first information handling system to capture the context of the display shown on the second information handling system and allow the user to access the corresponding network location on the first information handling system. At predefined process 360, the process performs the Capture Digital Image routine (see FIG. 4 and corresponding text for processing details). At predefined process 370, the process performs the Identify Image Context routine (see FIG. 5 and corresponding text for processing details). At predefined process 380, the process performs the Use Context to Identify Network Location (e.g., URL, etc.) routine (see FIG. 6 and corresponding text for processing details). Finally, at predefined process 390, the process performs the Fetch Data from Network Location and Present on First Computing Device routine (see FIG. 7 and corresponding text for processing details). FIG. 3 processing thereafter ends at 395.

Figure 4:
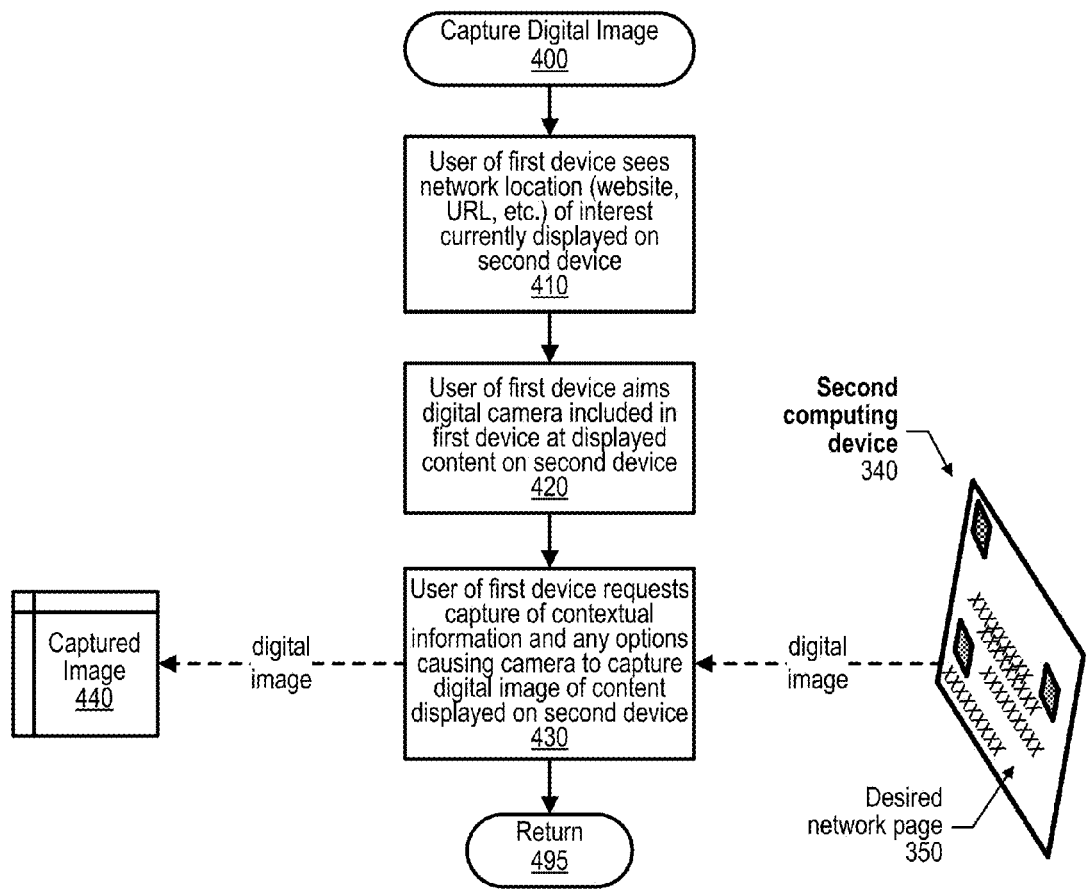
FIG. 4 is a flowchart depicting steps taken to capture a digital image used to capture contextual information on a device.

FIG. 4 is a flowchart depicting steps taken to capture a digital image used to capture contextual information on a device. FIG. 4 processing commences at 400 and shows the steps taken by a process that captures a digital image from another display. At step 410, the user of the first information handling system sees a network location that is of interest on another display that is displaying data from a second information handling system. The network location might be a website, a URL, an item in an online store, a social media post, etc. that is currently being displayed on the display of the second information handling system.

At step 420, the user of the first information handling system aims the digital camera incorporated to or accessible by the first information handling system at the network location being displayed on second information handling system 340, such as desired network page 350. At step 430, the user of the first information handling system requests the capture of contextual information and also requests any options. The request can be made by selecting an icon, performing a gesture, or the like at the first information handling system. The user's request causes the camera that is accessible from the first information handling system to capture a digital image of the content that is currently being displayed on the display of the second information handling system, such as a network location (e.g., web page, etc.). FIG. 4 processing thereafter returns to the calling routine (see FIG. 3) at 495.

Figure 5:
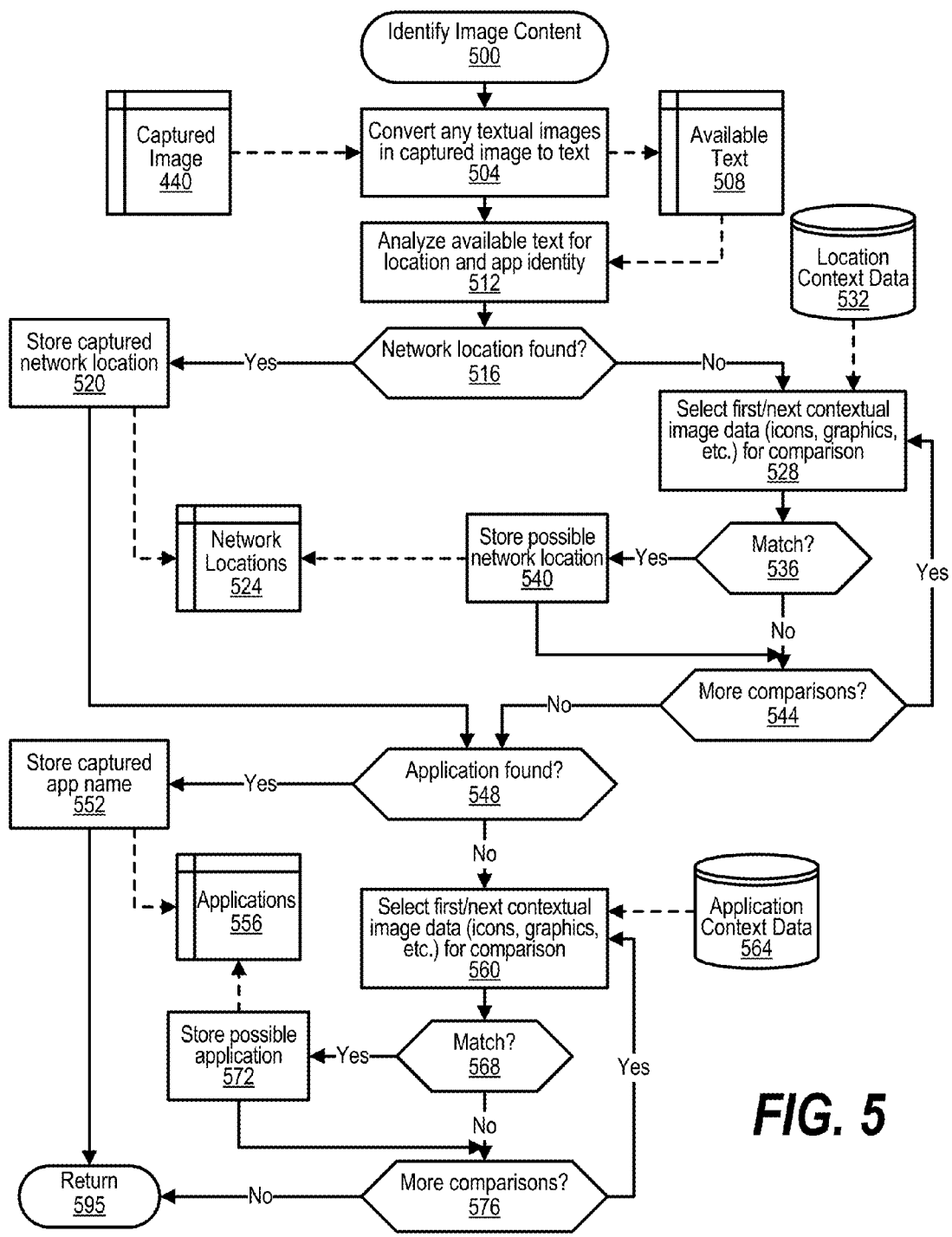
FIG. 5 is a flowchart depicting steps taken to identify image content in order to capture contextual information on a device.

FIG. 5 is a flowchart depicting steps taken to identify image content in order to capture contextual information on a device. FIG. 5 processing commences at 500 and shows the steps taken by a process that identifies image content using textual and contextual analysis techniques. At step 504, the process converts any textual images found in the captured image to a text format for textual analysis. The captured image is retrieved from memory area 440 and the text retrieved from the captured image is stored in memory area 508. At step 512, the process analyzes any available text for a location address (e.g., URL, etc.) and a software application (e.g., app, etc.) identification (e.g., a browser, a merchant shopping application, a social media application, etc.). The process determines as to whether a full or partial network location was found in the text that was retrieved from the captured image (decision 516). If a network location was found in the text, then decision 516 branches to the 'yes' branch whereupon, at step 520, the process stores the captured network location in memory area 524. On the other hand, if a network location was not found, then decision 516 branches to the 'no' branch to perform steps 528 through 544.

If the network location was not retrieved from the captured text, then steps 528 through 544 are performed. At step 528, the process selects the first contextual image data (icons, graphics, etc.) from the captured image to use for comparison against location contextual images (e.g., icons, graphics, etc. such as logos and other graphics found on various web pages or other network locations, etc.). The process determines as to whether the selected contextual image from the captured image matches a known image from a network location (decision 536). If the selected contextual image from the captured image matches a known image from a network location, then decision 536 branches to the 'yes' branch whereupon, at step 540, the process stores the location data as a possible network location in memory area 524. On the other hand, if the selected contextual image from the captured image does not match a known image from any of the stored network locations, then decision 536 branches to the 'no' branch bypassing step 540.

The process determines as to whether there are more contextual image data elements in the captured image to use for comparison against known contextual data corresponding to network locations (decision 544). If there are more contextual image data elements in the captured image to use for comparison, then decision 544 branches to the 'yes' branch which loops back to step 528 to select and process the next contextual image data from the captured image as described above. This looping continues until there are no more contextual image data elements in the captured image to use for comparison, at which point decision 544 branches to the 'no' branch exiting the loop.

The process determines as to whether the application that was used to display the network location data was found in any textual data that was extracted from the captured image (decision 548). If the application that was used to display the network location data was found in any textual data that was extracted from the captured image, then decision 548 branches to the 'yes' branch whereupon, at step 552, the application name (e.g., a browser name, a merchant app name, etc.) is stored in memory area 556 and processing returns to the calling routine (see FIG. 3) at 595.

On the other hand, if the application that was used to display the network location data was not found in any textual data that was extracted from the captured image, then decision 548 branches to the 'no' branch to perform steps 560 through 576. If the application name was not retrieved from the captured text, then steps 560 through 576 are performed. At step 560, the process selects the first contextual image data (icons, graphics, etc.) from the captured image to use for comparison against application contextual images (e.g., icons, graphics, etc. such as logos and other graphics found on various applications such as browsers, merchant apps, social media apps, etc.). The application contextual data is retrieved from data store 564. The process determines as to whether the selected contextual data matches the retrieved application contextual data (decision 568). If the selected contextual data matches the retrieved application contextual data, then decision 568 branches to the 'yes' branch whereupon, at step 572, the process stores the application name corresponding to the matching contextual data as a possible application name in memory area 556. On the other hand, if the selected contextual data does not match the retrieved application contextual data, then decision 568 branches to the 'no' branch bypassing step 572. I The process determines whether there are more contextual data elements from the captured image to use for comparisons against known application contextual data (decision 576). If there are more contextual data elements from the captured image to use for comparisons against known application contextual data, then decision 576 branches to the 'yes' branch which loops back to step 560 to repeat the processing as described above. This looping continues until there are no more contextual data elements to process, at which point decision 576 branches to the 'no' branch exiting the loop. FIG. 5 processing thereafter returns to the calling routine (see FIG. 3) at 595.

Figure 6:
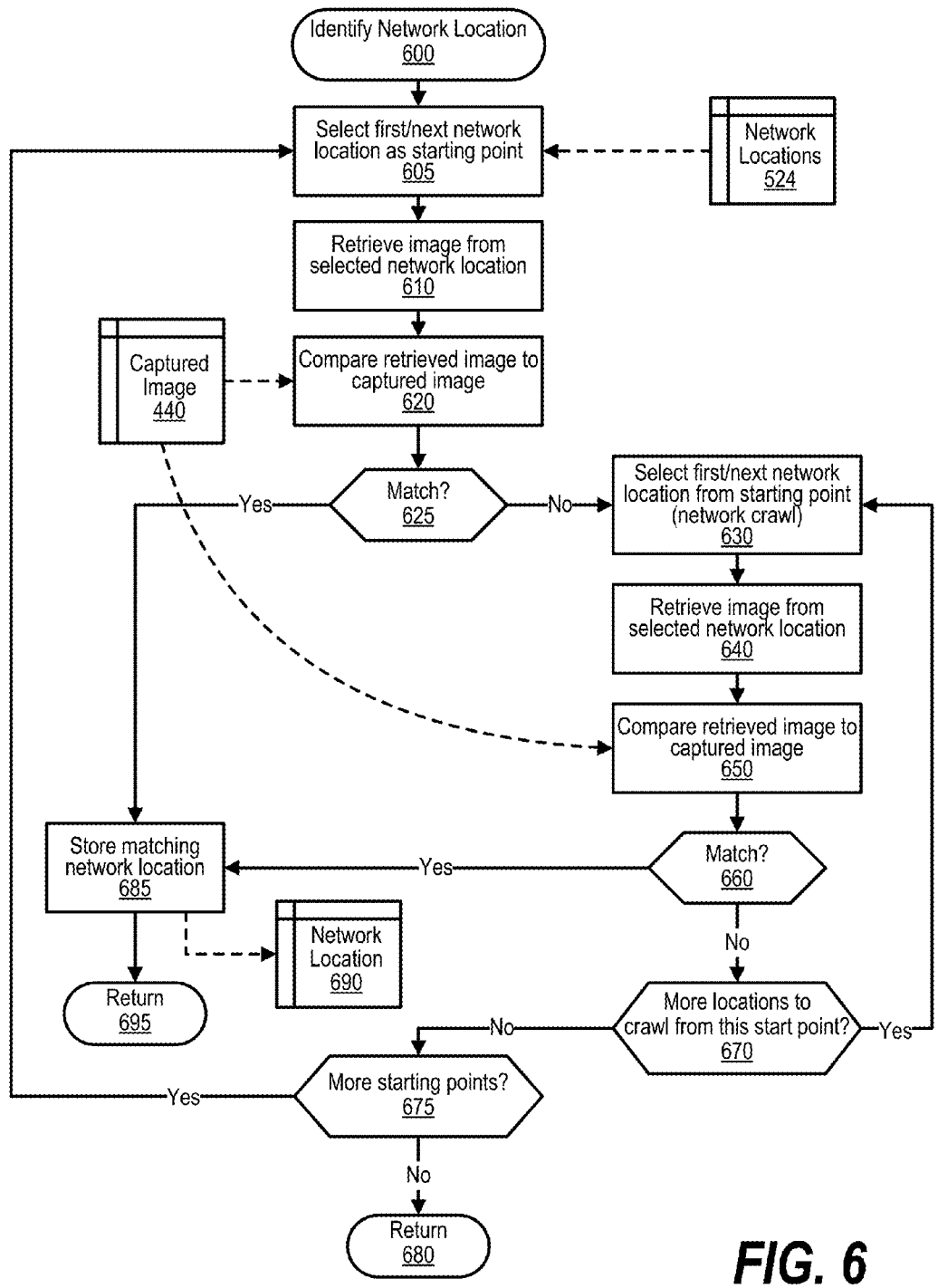
FIG. 6 is a flowchart depicting steps taken to use context to identify a network location of a desired resource.

FIG. 6 is a flowchart depicting steps taken to use context to identify a network location of a desired resource. FIG. 6 processing commences at 600 and shows the steps taken by a process that identify Network Location. At step 605, the process selects the first network location from the set of network locations stored in memory area 524 as the starting point in the network location search. At step 610, the process retrieves the image from selected network location (e.g., an image of a web page at the selected location, etc.). At step 620, the process compares the retrieved image to the digital image captured from the second information handling system. The captured digital image is stored in memory area 440.

The process determines as to whether the retrieved image from the network location matches the captured digital image (decision 625). If the retrieved image from the network location does not match the captured digital image, then decision 625 branches to the 'no' branch to commence a loop that crawls through network locations that start, or branch from, the selected network location using steps 630 through 670. When the retrieved image from the network location matches the captured digital image, then decision

625 branches to the 'yes' branch whereupon, at step 685, the matching network location identifier (e.g., URL, etc.) is stored in memory area 690 and processing returns to the calling routine (see FIG. 3) at 695.

Steps 630 through 670 are used to crawl through network locations that start, or branch from, the selected network location. At step 630, the process selects the first network location from the starting point. At step 640, the process retrieves the image (e.g., webpage, etc.) from the selected network location. At step 650, the process compares the image retrieved from the network location to the captured image that was stored in memory area 440. The process determines as to whether the retrieved image from the network location matches the captured digital image (decision 660). If the retrieved image from the network location matches the captured digital image, then decision 660 branches to the 'yes' branch whereupon, at step 685, the matching network location identifier (e.g., URL, etc.) is stored in memory area 690 and processing returns to the calling routine (see FIG. 3) at 695. On the other hand, if the retrieved image from the network location does not match the captured digital image, then decision 660 branches to the 'no' branch to continue looping through the network locations that start, or branch from, the selected network location.

The process determines as to whether there are more network locations that emanate from the currently selected start point (decision 670). If there are more network locations that emanate from the currently selected start point, then decision 670 branches to the 'yes' branch which loops back to step 630 to select and process the next network location that emanates from the starting point. This looping continues until there are no more network locations that emanate from the starting point, at which point decision 670 branches to the 'no' branch exiting the loop.

The process determines as to whether there are more potential starting points that were stored in memory area 524 (decision 675). If there are more potential starting points, then decision 675 branches to the 'yes' branch which loops back to step 605 to select and process the next starting point as described above. This looping continues until either a network location matching the captured digital image is found, at which point processing returns at 695, or until there are no more starting points to process, at which point decision 675 branches to the 'no' branch exiting the loop and processing returns at 680 to the calling routine (see FIG. 3) without finding a matching network location (e.g., the digital image was of a page that is not found on the Internet, etc.).

Figure 7:
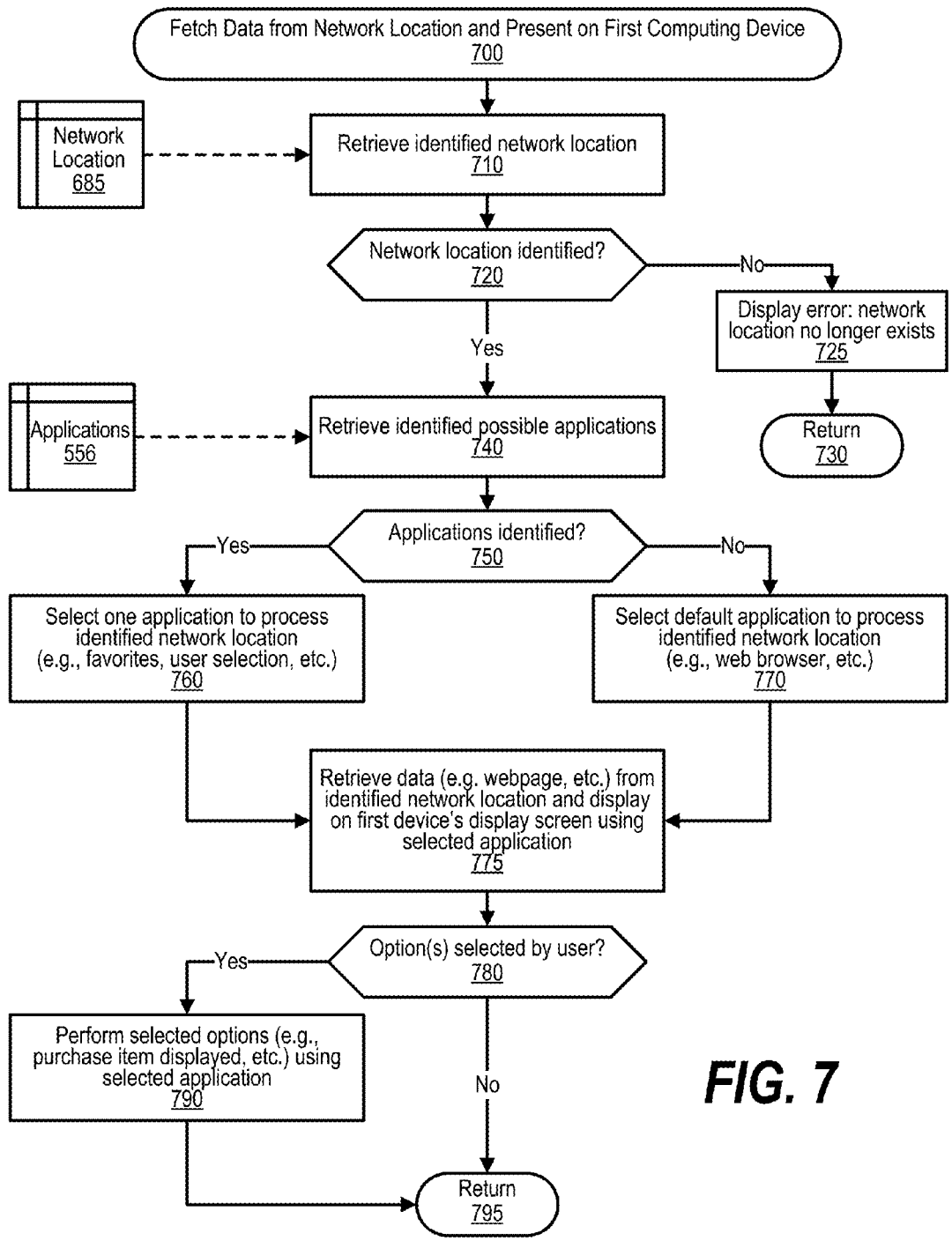
FIG. 7 is a flowchart depicting steps taken to retrieve data from an identified network location and present such data to a user of a computing device.

FIG. 7 is a flowchart depicting steps taken to retrieve data from an identified network location and present such data to a user of a computing device. FIG. 7 processing commences at 700 and shows the steps taken by a process that gathers data from an identified network location, such as a web page, and presents the data to the user on the first computing device using an identified application, such as a browser or online merchant app. At step 710, the process retrieves the identified network location from memory area 685. The process determines as to whether processing was able to identify the network location (decision 720). If processing was unable to identify the network location, then decision 720 branches to the 'no' branch whereupon, at step the process displays error indicating that the network location could not be found and processing returns to the calling routine (see FIG. 3) at 730.

On the other hand, if processing was able to identify the network location, then decision 720 branches to the 'yes' branch for further processing. At step 740, the process retrieves any applications that were identified as possibly being the application that was displaying the data in the captured digital image. This data is retrieved from memory area 556. The process determines as to whether any applications were identified (decision 750). If applications were identified, then decision 750 branches to the 'yes' branch to perform step 760. On the other hand, if no applications were identified, then decision 750 branches to the 'no' branch to perform step 770. At step 760, the process selects one of the applications from memory area 556 to process the identified network location. The application can be identified by prompting the user to select one of the applications, matching the applications against a list of the user's favorite applications, and the like. If an application was not identified then, at step 770, the process selects a default application, such as a web browser application, that will be used to process the identified network location.

At step 775, the process retrieves data, such as a webpage, etc., from the identified network location and displays the retrieved data on the first device's display screen using the application selected at either step 760 or 770. The process determines as to whether any options were selected by the user when the user invoked the process (decision 780). Options might include, automatically purchasing an item using the user's payment information, etc. If any options were selected by the user, then decision 780 branches to the 'yes' branch whereupon, at step 790 the process performs any selected options (e.g., purchase item displayed, etc.) using the selected application. On the other hand, if no options were selected by the user, then decision 780 branches to the 'no' branch bypassing step 790. FIG. 7 processing thereafter returns to the calling routine (see FIG. 3) at 795.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   capturing, at a digital camera of a first information handling system, a digital image of a display of a second information handling system;
   analyzing the captured digital image, the analysis resulting in an identification of a network location corresponding to the captured digital image, wherein the analyzing further comprises:
   identifying one or more portions of the digital image;

comparing the identified portions of the digital image with a plurality of stored network location contextual image data; and
identifying one or more possible network locations based on the comparison;
retrieving, at the first information handling system, data from the identified network location via a network connection; and
displaying the data from the identified network location at a first display accessible by the first information handling system.

2. The method of claim 1 further comprising:
detecting a software application used to display the digital image on the display of the second information handling system, the detecting further comprising:
identifying one or more portions of the digital image;
comparing the identified portions of the digital image with a plurality of stored application contextual image data; and
identifying the software application based on the comparison.

3. The method of claim 2 further comprising:
executing the identified software application at the first information handling system; and
loading the data from the identified network location into the software application executing at the first information handling system, wherein the loading results in the displaying of a user interface of the software application and the data at the first display.

4. The method of claim 1 wherein the analyzing further comprises:
identifying one or more portions of the digital image that include image of text;
extracting the textual images from the digital image;
converting the extracted textual images to a plurality of text characters using a character recognition process;
comparing the text characters to a plurality of sets of text characters, wherein each of the sets of text characters corresponds to a network location from a plurality of stored network locations; and
identifying the network locations based on the comparison.

5. The method of claim 1 further comprising:
detecting a software application used to display the digital image on the display of the second information handling system, the detecting further comprising:
identifying one or more portions of the digital image that include image of text;
extracting the textual images from the digital image;
converting the extracted textual images to a plurality of text characters using a character recognition process;
comparing the identified portions of the digital image with a plurality of stored application sets of text data; and
identifying the software application based on the comparison.

6. The method of claim 5 further comprising:
executing the identified software application at the first information handling system; and
loading the data from the identified network location into the software application executing at the first information handling system, wherein the loading results in the displaying of a user interface of the software application and the data at the first display.

7. An information handling system comprising:
one or more processors;
a memory coupled to at least one of the processors; and
a set of instructions stored in the memory and executed by at least one of the processors to perform actions comprising:
capturing, at a digital camera of a first information handling system, a digital image of a display of a second information handling system;
analyzing the captured digital image, the analysis resulting in an identification of a network location corresponding to the captured digital image analyzing the captured digital image, the analysis resulting in an identification of a network location corresponding to the captured digital image, wherein the analyzing further comprises:
identifying one or more portions of the digital image;
comparing the identified portions of the digital image with a plurality of stored network location contextual image data; and
identifying one or more possible network locations based on the comparison;
retrieving, at the first information handling system, data from the identified network location via a network connection; and
displaying the data from the identified network location at a first display accessible by the first information handling system.

8. The information handling system of claim 7 wherein the actions further comprise:
detecting a software application used to display the digital image on the display of the second information handling system, the detecting wherein the actions further comprise:
identifying one or more portions of the digital image;
comparing the identified portions of the digital image with a plurality of stored application contextual image data; and
identifying the software application based on the comparison.

9. The information handling system of claim 8 wherein the actions further comprise:
executing the identified software application at the first information handling system; and
loading the data from the identified network location into the software application executing at the first information handling system, wherein the loading results in the displaying of a user interface of the software application and the data at the first display.

10. The information handling system of claim 7 wherein the analyzing further comprises:
identifying one or more portions of the digital image that include image of text;
extracting the textual images from the digital image;
converting the extracted textual images to a plurality of text characters using a character recognition process;
comparing the text characters to a plurality of sets of text characters, wherein each of the sets of text characters corresponds to a network location from a plurality of stored network locations; and
identifying the network locations based on the comparison.

11. The information handling system of claim 7 wherein the actions further comprise:
detecting a software application used to display the digital image on the display of the second information handling system, the detecting further comprising actions of:
identifying one or more portions of the digital image that include image of text;

extracting the textual images from the digital image;
converting the extracted textual images to a plurality of text characters using a character recognition process;
comparing the identified portions of the digital image with a plurality of stored application sets of text data; and
identifying the software application based on the comparison.

12. The information handling system of claim 11 wherein the actions further comprise:
executing the identified software application at the first information handling system; and
loading the data from the identified network location into the software application executing at the first information handling system, wherein the loading results in the displaying of a user interface of the software application and the data at the first display.

13. A computer program product comprising:
a computer readable storage medium comprising a set of computer instructions, the computer instructions effective to:
capturing, at a digital camera of a first information handling system, a digital image of a display of a second information handling system;
analyzing the captured digital image, the analysis resulting in an identification of a network location corresponding to the captured digital image analyzing the captured digital image, the analysis resulting in an identification of a network location corresponding to the captured digital image, wherein the analyzing further comprises:
identifying one or more portions of the digital image;
comparing the identified portions of the digital image with a plurality of stored network location contextual image data; and
identifying one or more possible network locations based on the comparison;
retrieving, at the first information handling system, data from the identified network location via a network connection; and
displaying the data from the identified network location at a first display accessible by the first information handling system.

14. The computer program product of claim 13 wherein the instructions are further effective to:
detecting a software application used to display the digital image on the display of the second information handling system, the detecting wherein the instructions are further effective to:
identifying one or more portions of the digital image;
comparing the identified portions of the digital image with a plurality of stored application contextual image data; and
identifying the software application based on the comparison.

15. The computer program product of claim 14 wherein the instructions are further effective to:
executing the identified software application at the first information handling system; and
loading the data from the identified network location into the software application executing at the first information handling system, wherein the loading results in the displaying of a user interface of the software application and the data at the first display.

16. The computer program product of claim 13 wherein the analyzing further comprises:
identifying one or more portions of the digital image that include image of text;
extracting the textual images from the digital image;
converting the extracted textual images to a plurality of text characters using a character recognition process;
comparing the text characters to a plurality of sets of text characters, wherein each of the sets of text characters corresponds to a network location from a plurality of stored network locations; and
identifying the network locations based on the comparison.

17. The computer program product of claim 13 wherein the instructions are further effective to:
detecting a software application used to display the digital image on the display of the second information handling system, the detecting further comprising:
identifying one or more portions of the digital image that include image of text;
extracting the textual images from the digital image;
converting the extracted textual images to a plurality of text characters using a character recognition process;
comparing the identified portions of the digital image with a plurality of stored application sets of text data; and
identifying the software application based on the comparison.

* * * * *